United States Patent
Jiang et al.

(10) Patent No.: US 10,673,336 B2
(45) Date of Patent: Jun. 2, 2020

(54) DC-DC CONVERTER WITH DROOP REGULATION

(71) Applicant: Chengdu Monolithic Power Systems Co. Ltd., Chengdu (CN)

(72) Inventors: Lijie Jiang, Hangzhou (CN); Xiaokang Wu, Hangzhou (CN); Binci Xu, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 16/219,833

(22) Filed: Dec. 13, 2018

(65) Prior Publication Data

US 2019/0199212 A1 Jun. 27, 2019

(30) Foreign Application Priority Data

Dec. 21, 2017 (CN) .......................... 2017 1 1391558

(51) Int. Cl.
*H02M 3/158* (2006.01)
*H02M 1/08* (2006.01)
*H02M 3/155* (2006.01)
*H02M 3/335* (2006.01)
*H02M 1/00* (2006.01)
*H02M 3/156* (2006.01)

(52) U.S. Cl.
CPC ............ *H02M 3/158* (2013.01); *H02M 1/08* (2013.01); *H02M 3/155* (2013.01); *H02M 3/335* (2013.01); H02M 2001/0003 (2013.01); H02M 2001/0009 (2013.01); H02M 2001/0019 (2013.01); H02M 2001/0025 (2013.01); H02M 2003/1566 (2013.01)

(58) Field of Classification Search
CPC ...... H02M 3/158; H02M 3/335; H02M 3/155; H02M 1/08; H02M 2001/0025; H02M 2003/1566; H02M 2001/0019; H02M 2001/0009; H02M 2001/0003; H02M 2001/0038; H02M 1/32; H02M 1/00
See application file for complete search history.

(56) References Cited

U.S. PATENT DOCUMENTS 9,356,510 B2 * 5/2016 Jiang ..................... H02M 3/156
9,696,350 B2 * 7/2017 Burton .................. H02M 3/157
(Continued)

OTHER PUBLICATIONS

U.S. Appl. No. 15/344,429, filed Nov. 4, 2016, Chengdu Monolithic Power Systems Co., Ltd. . . .
(Continued)

*Primary Examiner* — Kyle J Moody
(74) *Attorney, Agent, or Firm* — Perkins Coie LLP

(57) ABSTRACT

A DC-DC converter with droop regulation for better transient performance. The DC-DC converter includes a switching circuit, a comparison circuit and a logic control circuit. A differential voltage indicative of an output voltage of the switching circuit, and a droop voltage indicative of an output current of the switching circuit, are generated. A high-pass filtered signal is obtained by high-pass filtering the droop voltage. The comparison circuit responds to the differential voltage, a reference voltage and the high-pass filtered signal to generate a set signal. The logic control circuit generates a control signal based on the set signal to control the switching circuit.

10 Claims, 8 Drawing Sheets

(56) References Cited

U.S. PATENT DOCUMENTS

| | | | | |
|---|---|---|---|---|
| 2003/0034762 A1* | 2/2003 | Tateishi | ................ | H02M 3/156 323/282 |
| 2004/0051510 A1* | 3/2004 | Saggini | ................ | H02M 3/157 323/282 |
| 2010/0308654 A1* | 12/2010 | Chen | ................... | H02M 3/1584 307/31 |
| 2011/0187341 A1* | 8/2011 | Chiu | ....................... | G05F 1/618 323/285 |
| 2019/0302818 A1* | 10/2019 | Liu | ....................... | H02M 3/156 |

OTHER PUBLICATIONS

U.S. Appl. No. 15/623,265, filed Jun. 14, 2017, Monolithic Power System, Inc.

* cited by examiner

DC-DC CONVERTER WITH DROOP REGULATION

CROSS-REFERENCE TO RELATED APPLICATION

This application claims priority to and the benefit of CN Patent Application No. 201711391558.7, filed Dec. 21, 2017, which is incorporated herein by reference in its entirety.

TECHNICAL FIELD

The present invention generally relates to electrical circuits, and more particularly but not exclusively relates to a DC-DC converter and method thereof.

BACKGROUND

In many electronic products such as laptops, desktops and PDAs (Personal Digital Assistant), DC sources are needed to supply power to each functional module. As COT (constant on time) DC-DC converters have advantages of fast transient response, simple structures and so on, they are widely applied in electronic products.

Ramp compensation is generally required for COT DC-DC converters to stabilize an output voltage. In prior art, a ramp compensation signal has a constant slope. When a power switch in a COT DC-DC converter is turned on, the ramp compensation signal is reset to zero, and then increases with the constant slope. When the output voltage decreases to the sum of the ramp compensation signal and a reference voltage, the power switch is turned on, and the ramp compensation signal is reset to zero again. This process repeats in every switching cycle.

However, when a load steps up, as the output voltage decreases rapidly, a feedback control loop of the COT DC-DC converter generates a cluster of pulses in a short time. Due to the cluster of pulses, an inductor current increases sharply, and the output voltage is then pumped higher, thus an overshoot in the output voltage is induced. In some cases, there is even a ring back in the output voltage after the overshoot. Accordingly, it is necessary to suppress the overshoot and the ring back in the output voltage to improve the performance of load transient response.

Also, in some applications, it is required that the output voltage decreases as the output current increases, so as to reduce the peak-to-peak value of the output voltage during the transient process to improve the stability.

That is to say, DC droop is needed in the aforementioned applications and similar situations.

SUMMARY

The present invention is directed to provide an improved DC-DC converter with DC droop.

There has been provided, in accordance with an embodiment of the present invention, a DC-DC converter, comprising: a switching circuit having a power switch, wherein the power switch is turned on and off periodically to convert an input voltage to an output voltage to supply power to a load; a comparison circuit, generating a set signal based on a differential voltage, a reference voltage and a high-pass filtered signal obtained by high-pass filtering a droop voltage, wherein the differential voltage is indicative of the output voltage, and the droop voltage is indicative of an output current; and a logic control circuit, generating a control signal based on the set signal to control the power switch of the switching circuit.

There has been provided, in accordance with an embodiment of the present invention, a DC-DC converter, comprising: a switching circuit having a power switch, wherein the power switch is turned on and off periodically to convert an input voltage to an output voltage to supply power to a load; a comparison circuit, generating a set signal based on the sum of a first filtering signal and a reference voltage, and the sum of a second filtering signal and a differential voltage, wherein the first filtering signal and the second filtering signal are respectively obtained by low-pass filtering the droop voltage, the differential voltage is indicative of the output voltage, and the droop voltage is indicative of an output current; and a logic control circuit, generating a control signal based on the set signal to control the switching circuit.

There has been provided, in accordance with an embodiment of the present invention, a method of controlling a DC-DC converter, wherein the DC-DC converter comprises a switching circuit to convert an input voltage to an output voltage for supplying power to a load, the method comprising providing a differential voltage indicative of the output voltage, and a droop voltage indicative of an output current; high-pass filtering the droop voltage to generate a high-pass filtered signal; comparing the sum of the high-pass filtered signal and the reference voltage with the differential voltage, or comparing the sum of the high-pass filtered signal and the differential voltage with the reference voltage, to generate a set signal; and responding to the set signal to control the switching circuit.

BRIEF DESCRIPTION OF THE DRAWINGS

The present invention can be further understood with reference to the following detailed description and the appended drawings, wherein like elements are provided with like reference numerals. The drawings are only for illustration purpose. They may only show part of the devices and are not necessarily drawn to scale.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

In the entire specifications, the reference to the phrases "an embodiment", "the embodiment", "an example", "the example" mean that the specific features, structures and characteristics described in conjunction with this embodiment or example are included in at least one embodiment of the present invention. Consequently, the phrases "an embodiment", "the embodiment", "an example", "the example" in any paragraphs and lines of the entire specifications, are not necessarily indicated to the same embodiments or examples. Furthermore, the specific features, structures and characteristics can be integrated into one or more embodiments or examples through any suitable combination and/or sub-combination. The phrase "connect" or "couple" refers to direct connection or indirect connection via interim media. On the contrary, the phrase "direct connect" or "direct coupling" refers to direct connection without interim media. The same reference label in different drawings indicates the same or like components. The term "and/or" comprise any or the all combinations in one or more concerning listed items.

Figure 1:
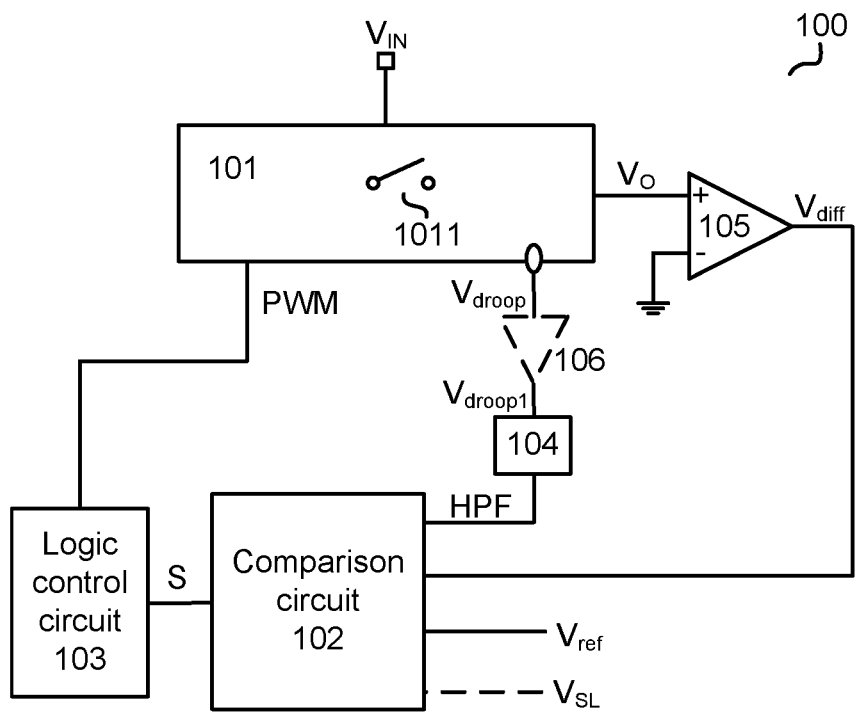
FIG. 1 schematically shows a DC-DC converter 100 in accordance with an embodiment of the present invention.

FIG. 1 schematically shows a DC-DC converter 100 in accordance with an embodiment of the present invention. In the example of FIG. 1, the DC-DC converter comprises: a switching circuit 101 having at least a power switch, wherein the power switch in the switching circuit 101 is turned on and off periodically to convert an input voltage $V_{IN}$ to an output voltage $V_o$ to supply power for a load (e.g. a CPU); a comparison circuit 102, responding to a differential voltage $V_{diff}$, a reference voltage $V_{ref}$, and a high-pass filtered signal HPF obtained by high-pass filtering a droop voltage $V_{droop}$, and generating a set signal S, wherein the differential voltage $V_{diff}$ is indicative of the output voltage $V_o$, and the droop voltage $V_{droop}$ is indicative of an output current $I_o$; a logic control circuit 103, receiving the set signal S and generating a control signal PWM to control the switching circuit 101.

High-pass filtering a droop voltage $V_{ref}$ means that high frequency components of the droop voltage $V_{droop}$ are kept, while low-frequency components of the droop voltage $V_{droop}$ are filtered out by a filter with certain corner frequency. Persons of ordinary skills in the art should recognize that, high-frequency components of the droop voltage $V_{droop}$ are the frequency components of the droop voltage $V_{droop}$ with higher frequency than the corner frequency, while low-frequency components of the droop voltage are the frequency components of the droop voltage with lower frequency than the corner frequency.

In some embodiments, the comparison circuit 102 compares the sum of the high-pass filtered signal HPF and the differential voltage $V_{diff}$ with the reference voltage $V_{ref}$, to generate the set signal S. When the sum of the high-pass filtered signal HPF and the differential voltage $V_{diff}$ is smaller than the reference voltage $V_{ref}$, the power switch in the switching circuit 101 is turned on.

In some other embodiments, the comparison circuit 102 compares the sum of the high-pass filtered signal HPF and the reference voltage $V_{ref}$ with the differential voltage $V_{diff}$ to generate the set signal S. When the differential voltage $V_{diff}$ is smaller than the sum of the high-pass filtered signal HPF and the reference voltage $V_{ref}$, the power switch in the switching circuit 101 is turned on.

In an embodiment, the comparison circuit 102 may further receive a ramp compensation signal $V_{SL}$ shown in dash line in FIG. 1. The ramp compensation signal $V_{SL}$ is used to stabilize an output voltage. The comparison circuit 102 generates the set signal S based on the high-pass filtered signal HPF, the ramp compensation signal $V_{SL}$, the differential voltage $V_{diff}$ and the reference voltage $V_{ref}$.

In the example of FIG. 1, the switching circuit 101 comprises at least a high-side power switch 1011. When the high-side power switch 1011 is turned on, a current flowing through the switching circuit 101 increases; when the high-side power switch 1011 is turned off, the current flowing through the switching circuit 101 decreases. The switching circuit 101 may further comprise a low-side power switch, wherein the high-side power switch and low-side power switch are controlled to be complimentarily conducted.

In an embodiment, the set signal S triggers the control signal PWM to turn on the high-side power switch 1011.

In the example of FIG. 1, the DC-DC converter 100 further comprises: a high-pass filter 104, filtering out low-frequency components of the droop voltage $V_{droop}$, and keeping high-frequency components of the droop voltage $V_{droop}$, to generate the high-pass filtered signal HPF.

In an embodiment, before provided to the high-pass filter 104, the droop voltage $V_{droop}$ is regulated by a buffer 106 shown in dash line in FIG. 1, to obtain a regulated droop signal $V_{droop1}$ that is at the same voltage level with the differential voltage $V_{diff}$. In some embodiments, the gain of the buffer is 1, namely the voltage level of the regulated droop signal $V_{droop1}$ is the same with the droop voltage $V_{droop}$.

In the example of FIG. 1, the DC-DC converter further comprises: a differential amplifier 105, receiving the output voltage $V_o$ and generating the differential voltage $V_{diff}$.

In the operation of the DC-DC converter 100, if a load steps up (e.g. a load current decreases suddenly), the droop voltage $V_{droop}$ increases fast and the output voltage $V_o$ decreases. In the high-pass filter 104, the low-frequency components of the droop voltage $V_{droop}$ is filtered out, while the high-frequency components of the droop voltage $V_{droop}$ is kept, so as to generate the high-pass filtered signal HPF. The low-frequency components of the droop voltage $V_{droop}$ indicates a steady information, while the high-frequency components of the droop voltage $V_{droop}$ indicates a transient information of the load. Namely, the high-pass filtered signal HPF is indicative of the transient information of the load.

Figure 2:
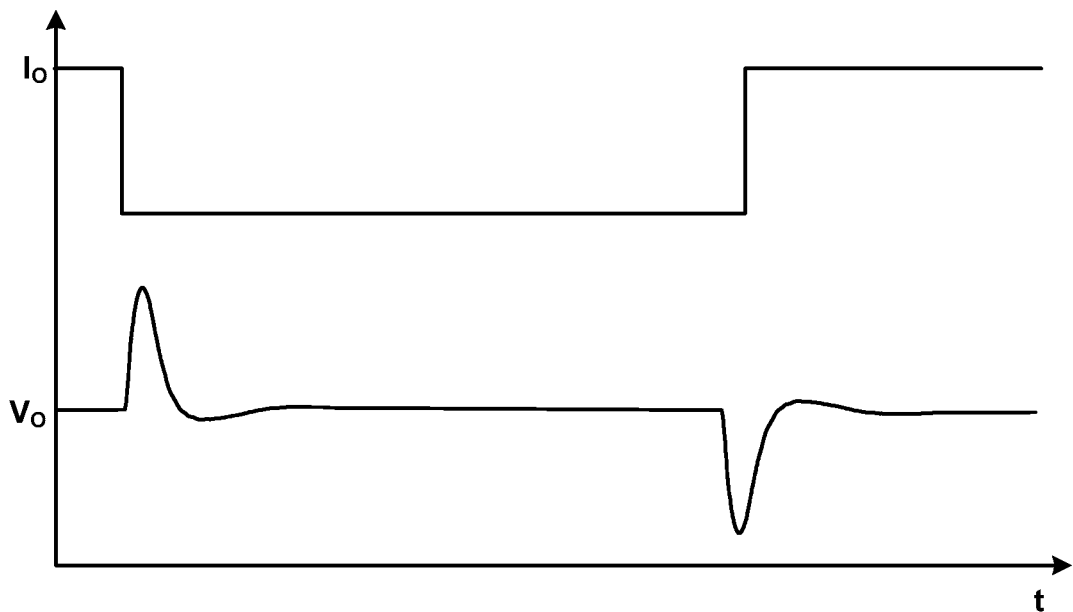
FIG. 2 illustrates waveforms of an output current Io and an output voltage Vo in the DC-DC converter 100 shown in FIG. 1.

Since the output voltage $V_o$ decreases as described above, the differential voltage $V_{diff}$ indicative of the output voltage $V_o$ decreases accordingly. In the case where the comparison circuit 102 compares the sum of the high-pass filtered signal HPF and the differential voltage $V_{diff}$ with the reference voltage $V_{ref}$ to generate the set signal S, the set signal S rises to high level and triggers the control signal PWM when the sum of the high-pass filtered signal HPF and the differential voltage $V_{diff}$ falls below the reference voltage $V_{ref}$. Compared with prior art, i.e. the case where the set signal S rises to high level when the differential voltage $V_{diff}$ is smaller than the reference voltage $V_{ref}$, it takes more time for the sum of the high-pass filtered signal HPF and the differential voltage $V_{diff}$ to fall below the reference voltage $V_{ref}$. Namely, the set signal S postpones to rise to high level, so there will be less pulses in the control signal PWM than in prior art. Thus, the energy stored in an inductor during the transient process is reduced, the ring back is then reduced and the stability is improved. FIG. 2 illustrates waveforms of an output current Io and an output voltage $V_o$ in the DC-DC converter 100 shown in FIG. 1.

Figure 3:
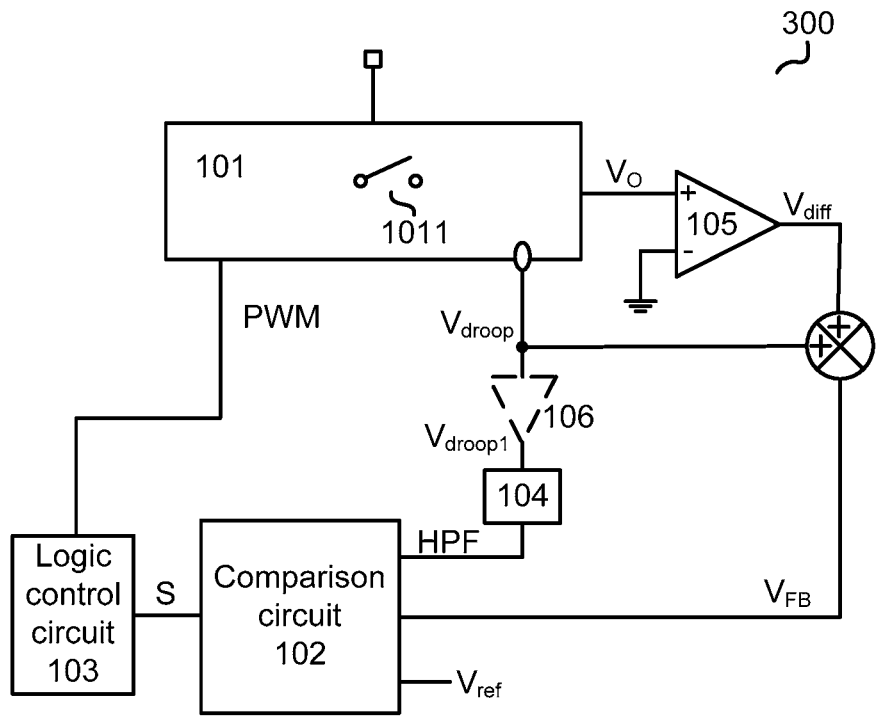
FIG. 3 schematically shows a DC-DC converter 300 in accordance with an embodiment of the present invention.

FIG. 3 schematically shows a DC-DC converter 300 in accordance with an embodiment of the present invention. The DC-DC converter 300 shown in FIG. 3 is similar with the DC-DC converter 100 in FIG. 1 with something different. In the example of FIG. 3, the droop voltage $V_{droop}$ is directly introduced to a feedback control loop. Namely, the comparison circuit 102 further receives the droop voltage $V_{droop}$, and generates the set signal S based on the high-pass filtered signal HPF, the reference voltage $V_{ref}$ and the sum of the droop voltage $V_{droop}$ and the differential voltage $V_{diff}$. So, the DC-DC converter 300 may further comprise an adder, and the adder adds the droop voltage $V_{droop}$ to the differential voltage $V_{diff}$ to generate a voltage feedback signal $V_{FB}$, wherein the voltage feedback signal $V_{FB}$ is provided to the comparison circuit 102.

Figure 4:
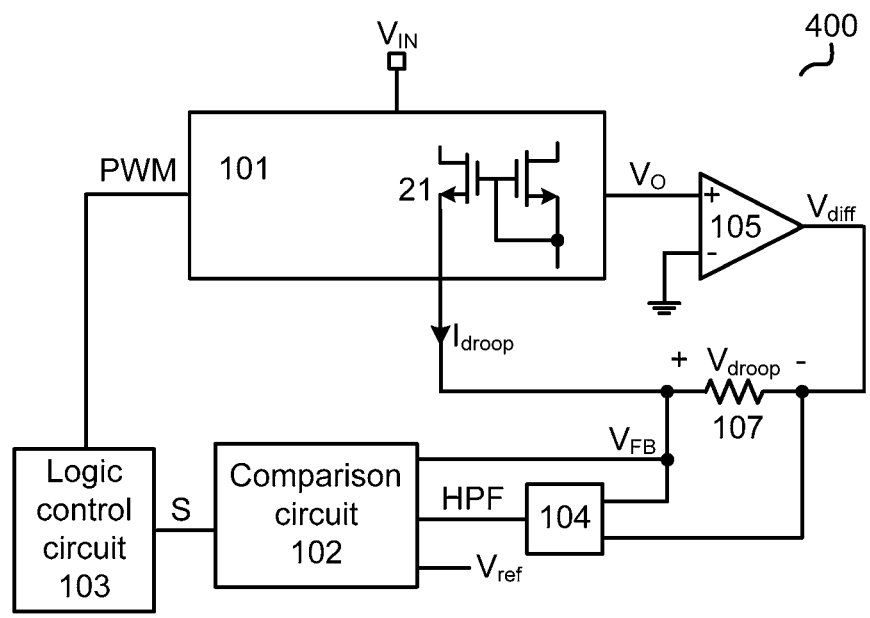
FIG. 4 schematically shows a DC-DC converter 400 in accordance with an embodiment of the present invention.

FIG. 4 schematically shows a DC-DC converter 400 in accordance with an embodiment of the present invention. An implementation of generating the droop voltage $V_{droop}$ is shown in the example of FIG. 4. The DC-DC converter 400 comprises the switching circuit 101, the comparison circuit 102, the logic control circuit 103, the high-pass filter 104 and the differential amplifier 105. In the example of FIG. 4, the DC-DC converter 400 further comprises a resistor 107, wherein a droop current $I_{droop}$ indicative of the output current $I_o$ flows through the resistor 107, and the voltage across the resistor 107 is the droop voltage $V_{droop}$.

In an embodiment, the droop current $I_{droop}$ may be provided by a current mirror. As shown in FIG. 4, the DC-DC converter 400 further comprises a mirror transistor 21, wherein a current flowing through the mirror switch 21 is in proportion to the current flowing through the high-side power switch 1011 (or the low-side power switch), to provide the droop current $I_{droop}$ indicative of the output current $I_o$.

In the example of FIG. 4, the differential voltage $V_{diff}$ is provided to the comparison circuit 102 via the resistor 107.

Figure 5:
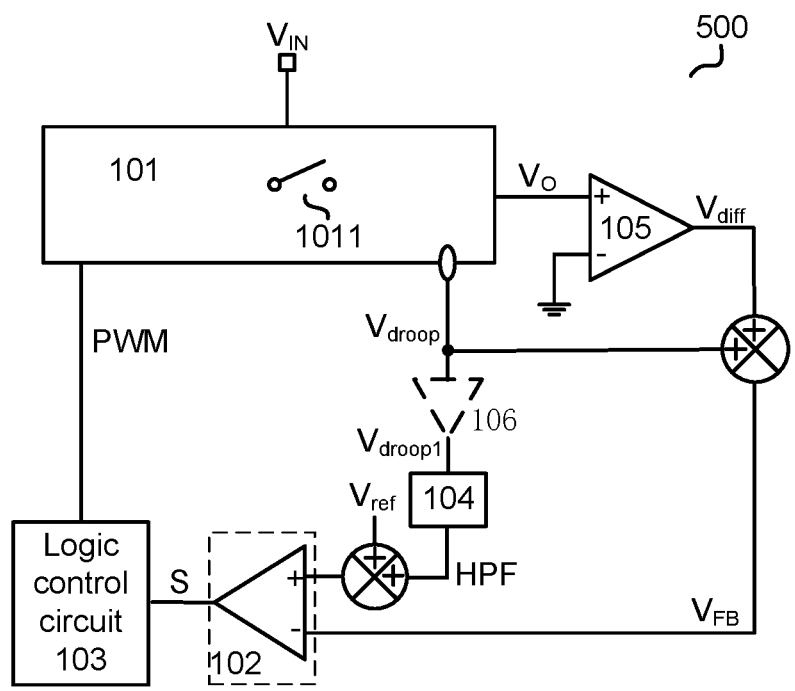
FIG. 5 schematically shows a DC-DC converter 500 in accordance with an embodiment of the present invention.

FIG. 5 schematically shows a DC-DC converter 500 in accordance with an embodiment of the present invention. In the example of FIG. 5, the comparison circuit 102 comprises a comparator having a first terminal, a second terminal and an output terminal, wherein the first terminal receives the sum of the reference voltage $V_{ref}$ and the high-pass filtered signal HPF, the second terminal receives the voltage feedback signal $V_{FB}$ (i.e. the sum of the differential voltage $V_{diff}$ and the droop voltage $V_{droop}$), and the comparator compares the sum of the reference voltage $V_{ref}$ and the high-pass filtered signal HPF with the voltage feedback signal $V_{FB}$ to generate the set signal S at the output terminal. When the sum of the reference voltage $V_{ref}$ and the high-pass filtered signal HPF is greater than the voltage feedback signal $V_{FB}$, the set signal S triggers the control signal PWM to turn on the high-side power switch 1011.

In an embodiment, the DC-DC converter 500 further comprises: an adder, adding the reference voltage $V_{ref}$ to the high-pass filtered signal HPF and providing the result to the comparator.

In the operation of the DC-DC converter 500, if the load steps up (e.g. a load current increases suddenly), the droop voltage $V_{droop}$ will increase fast and the output voltage $V_o$ decreases. As has been described above, the low-frequency components of the droop voltage $V_{droop}$ is filtered out, and the high-frequency components of the droop voltage $V_{droop}$ is kept to be the high-pass filtered signal HPF. Namely, the high-pass filtered signal HPF is indicative of a transient information. Since the output voltage $V_o$ decreases as described above, the differential voltage $V_{diff}$ decreases accordingly. In the DC-DC voltage converter 500, the comparator receives the sum of the reference voltage $V_{ref}$ and the high-pass filtered signal HPF at the first terminal, and receives the voltage feedback signal $V_{FB}$ (i.e. the sum of the droop voltage $V_{droop}$ and the differential voltage $V_{diff}$) at the second terminal, and compares the signals at the two terminals. As a result, the high-frequency components of the droop voltage $V_{droop}$ is counteracted in the comparator, while the low-frequency components of the droop voltage $V_{droop}$ is kept at the output terminal of the comparator.

Figure 6:
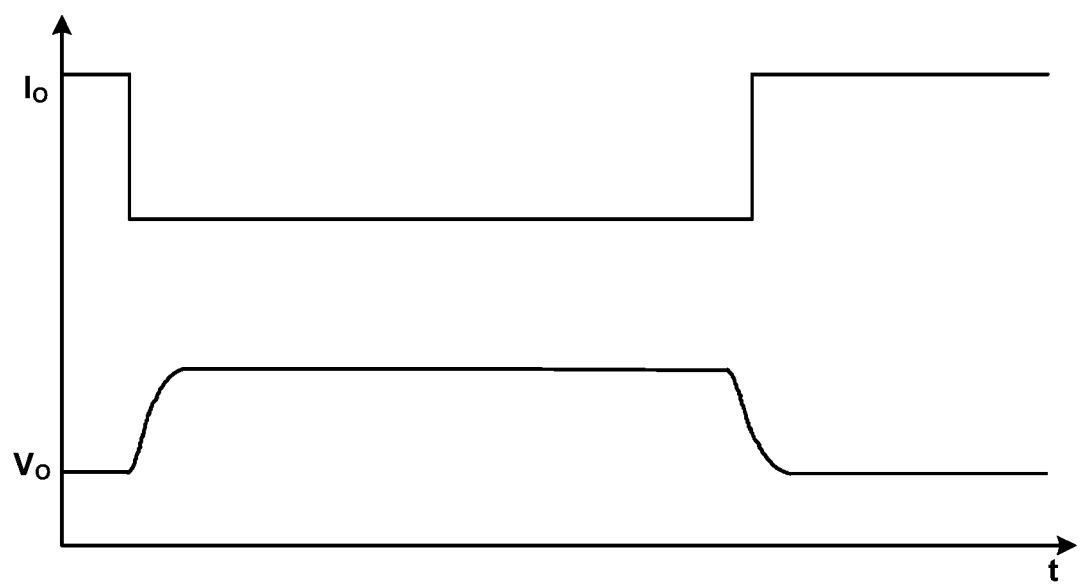
FIG. 6 illustrates waveforms of the output current Io and the output voltage Vo in the DC-DC converter 500 shown in FIG. 5.

In another word, the low-frequency components of the output current $I_o$ is introduced to the feedback control loop, so as to control the output voltage $V_o$ of the DC-DC converter 500. FIG. 6 illustrates waveforms of the output current $I_o$ and the output voltage $V_o$ in the DC-DC converter 500 shown in FIG. 5. As shown in FIG. 6, the output voltage $V_o$ of the DC-DC converter 500 decreases as the output current $I_o$ increases, meaning that the function of DC droop is realized. Meanwhile, the overshoot in the output voltage $V_o$ during the transient process is reduced.

Figure 7:
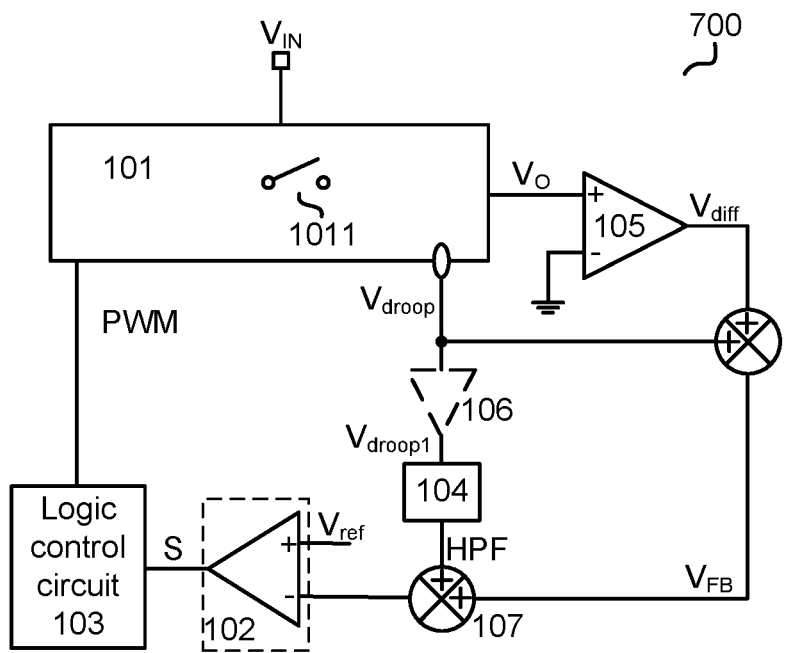
FIG. 7 schematically shows a DC-DC converter 700 in accordance with an embodiment of the present invention.

FIG. 7 schematically shows a DC-DC converter 700 in accordance with an embodiment of the present invention. In the example of FIG. 7, the comparison circuit 102 comprises a comparator having a first terminal, a second terminal and an output terminal, wherein the first terminal receives the reference voltage $V_{ref}$, the second terminal receives the sum of the voltage feedback signal $V_{FB}$ and the high-pass filtered signal HPF, and the comparator compares the reference voltage $V_{ref}$ with the sum of the voltage feedback signal $V_{FB}$ and the high-pass filtered signal HPF to generate the set signal S at the output terminal. When the reference voltage $V_{ref}$ is greater than the sum of the voltage feedback signal $V_{FB}$ and the high-pass filtered signal HPF, the set signal S triggers the control signal PWM to turn on the high-side power switch 1011.

In an embodiment, the DC-DC converter 700 further comprises: an adder 107, adding the voltage feedback signal $V_{FB}$ to the high-pass filtered signal HPF and providing the result to the comparator.

In the operation of the DC-DC converter 700, if the load steps up (e.g. a load current increases suddenly), the droop voltage Vdroop will increase fast and the output voltage $V_o$ decreases. As has been described above, the low-frequency components of the droop voltage $V_{droop}$ is filtered out, and the high-frequency components of the droop voltage $V_{droop}$ is kept to be the high-pass filtered signal HPF. Namely, the high-pass filtered signal HPF is indicative of a transient information. Since the output voltage $V_o$ decreases as described above, the differential voltage $V_{diff}$ decreases accordingly. In the DC-DC voltage converter 700, the comparator receives the reference voltage $V_{ref}$ at the first terminal, and receives the sum of the high-pass filtered signal HPF and the voltage feedback signal $V_{FB}$ (i.e. the sum of the droop voltage $V_{droop}$, the high-pass filtered signal HPF and the differential voltage $V_{diff}$) at the second terminal, and compares the signals at the two terminals. As a result, the high-frequency components of the droop voltage $V_{droop}$, as well as the whole droop voltage $V_{droop}$, is introduced to the feedback control loop, so as to control the output voltage $V_o$ of the DC-DC converter 700.

Figure 8:
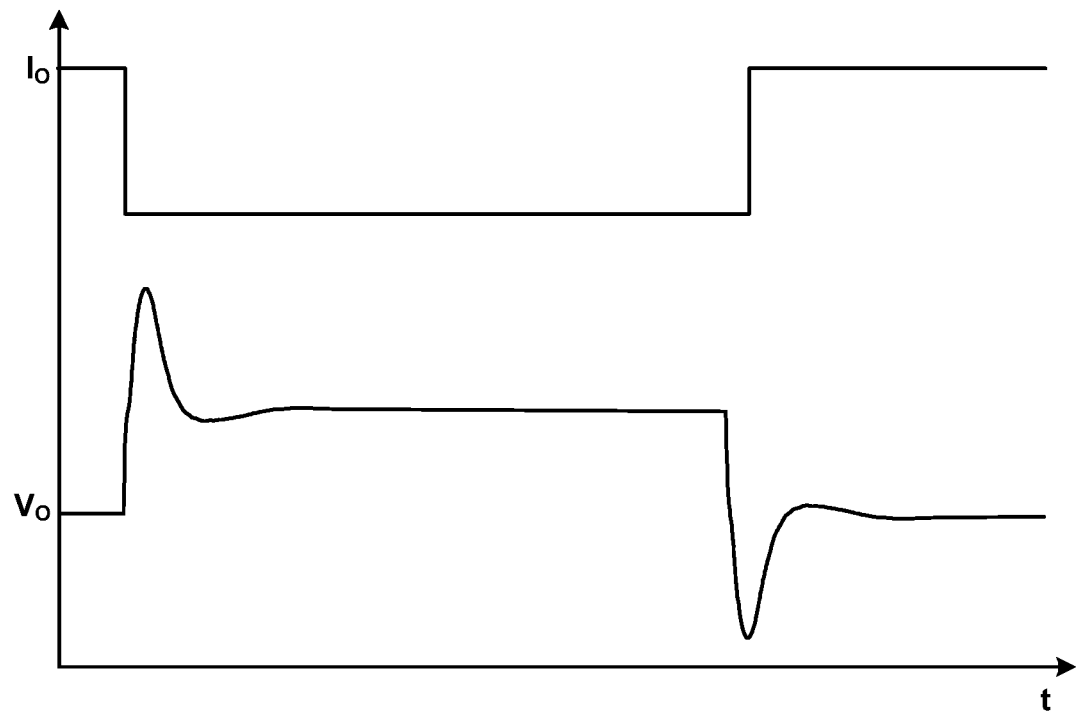
FIG. 8 illustrates waveforms of the output current Io and the output voltage Vo in the DC-DC converter 700 shown in FIG. 7.

FIG. 8 illustrates waveforms of the output current $I_o$ and the output voltage $V_o$ in the DC-DC converter 700 shown in FIG. 7. As shown in FIG. 8, the output voltage $V_o$ of the DC-DC converter 500 decreases when the output current $I_o$ increases, meaning that the function of DC droop is realized. Meanwhile, the set signal S postpones triggering the control signal PWM, so there will be less pulses in the control signal PWM than in prior art. Thus, the energy stored in an inductor during the transient process is reduced, the ring back is then reduced and the stability is improved.

Figure 9:
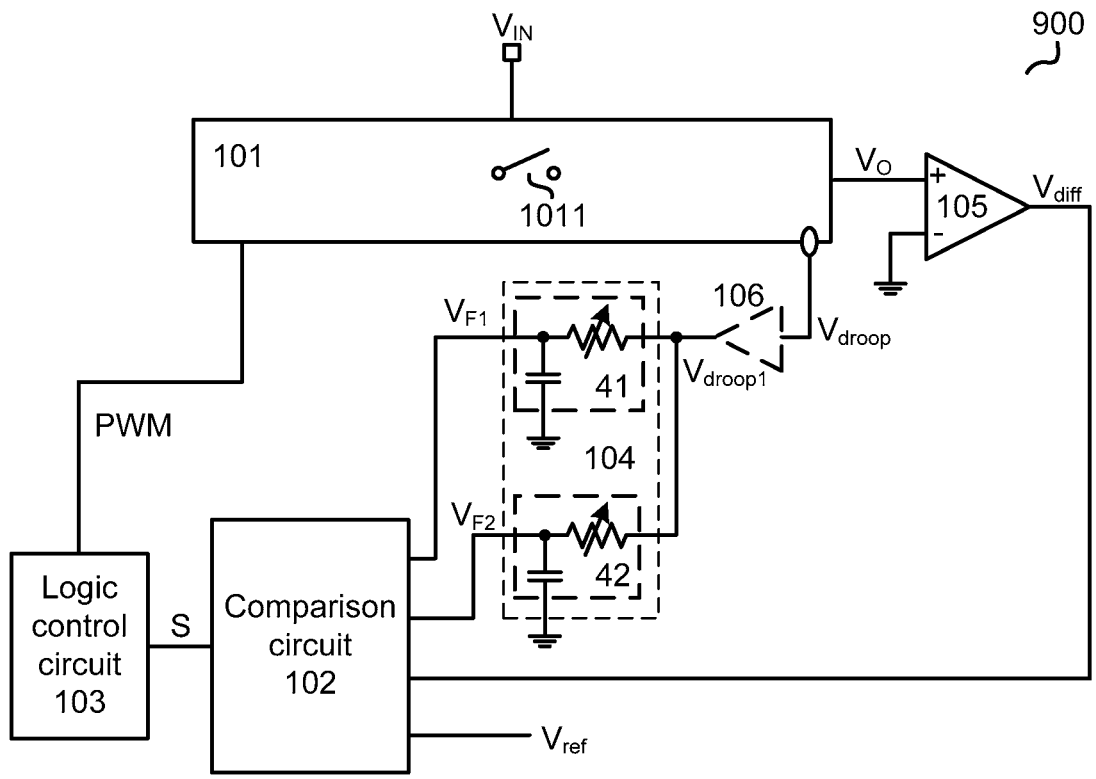
FIG. 9 schematically shows a high-pass filter 104 in a DC-DC converter 900 in accordance with an embodiment of the present invention.

FIG. 9 schematically shows a high-pass filter 104 in a DC-DC converter 900 in accordance with an embodiment of the present invention. In the example of FIG. 9, the high-pass filter 104 comprises: a first filter 41, receiving the droop voltage $V_{droop}$ and generating the first filtering signal $V_{F1}$, a second filter 42, receiving the droop voltage $V_{droop}$ and generating the second filtering signal $V_{F2}$; wherein, the respective bandwidths of the first filter 41 and the second filter 42 are adjustable.

In an embodiment, the first filter 41 and the second filter 42 both comprise RC circuits (resistors and capacitors) and filters (low-pass filters or all-pass filters), wherein the resistance of the resistors is adjustable.

Figure 10:
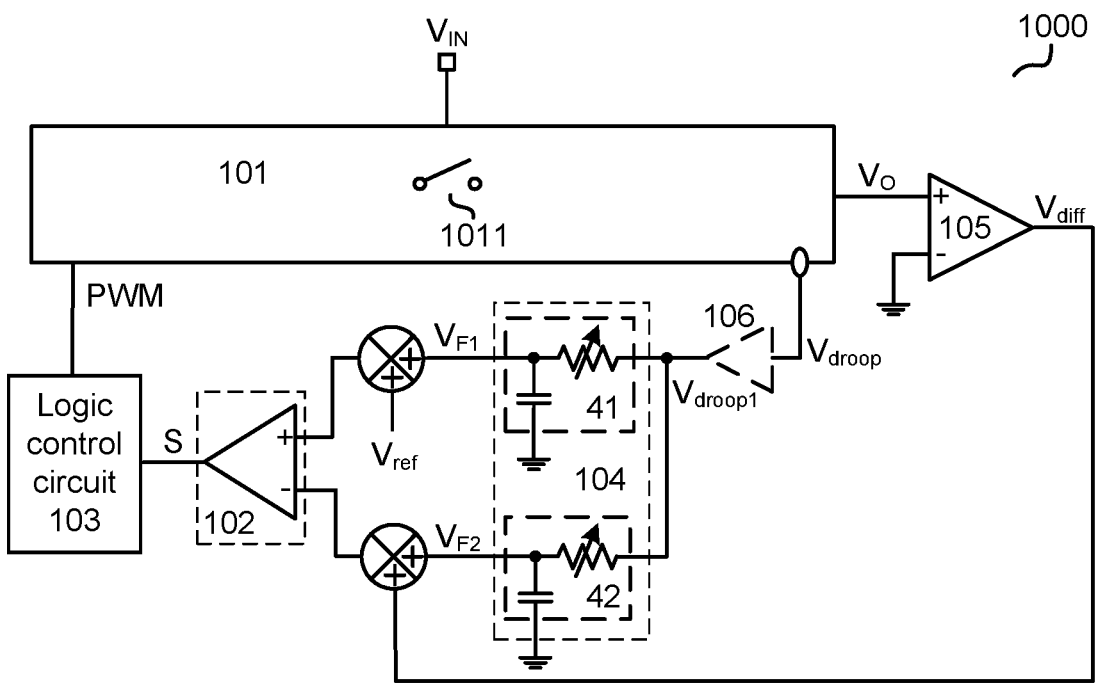
FIG. 10 schematically shows a DC-DC converter 1000 in accordance with an embodiment of the present invention.

FIG. 10 schematically shows a DC-DC converter 1000 in accordance with an embodiment of the present invention. As shown in FIG. 10, the DC-DC converter 1000 comprises: the switching circuits 101, wherein the power switch is turned on and off periodically to convert an input voltage $V_{IN}$ to an output voltage $V_o$ to supply power for a load (e.g. a CPU); a comparison circuit 102, responding to the sum of the first filtering signal $V_{F1}$ and the reference voltage $V_{ref}$, and to the sum of the second filtering signal $V_{F2}$ and the differential voltage $V_{diff}$, and generating a set signal S; a logic control circuit 103, generating a control signal PWM based on the set signal S to control the switching circuit 101.

In an embodiment, the comparison circuit 102 comprises a comparator, and the comparator compares the sum of the first filtering signal $V_{F1}$ and the reference voltage $V_{ref}$ with the sum of the second filtering signal $V_{F2}$ and the differential voltage $V_{diff}$, to generate the set signal S.

In some embodiments, in the first filter 41, the high-frequency components of the droop voltage $V_{droop}$ is filtered out and the low-frequency components of the droop voltage $V_{droop}$ is passed, and then the first filtering signal $V_{F1}$ is obtained. While in the second filter 42, both the high-frequency components and the low-frequency components of the droop voltage $V_{droop}$ are passed, and then the second filtering signal $V_{F2}$ is obtained. In some other embodiments, in the first filter 41, both the high-frequency components and the low-frequency components of the droop voltage $V_{droop}$ are passed, and the first filtering signal $V_{F1}$ is obtained, while in the second filter 42, the high-frequency components of the droop voltage $V_{droop}$ is filtered out and the low-frequency components of the droop voltage $V_{droop}$ is passed, and then the second filtering signal $V_{F2}$ is obtained.

In an embodiment, the droop voltage may be obtained by the resistor shown in FIG. 4.

Figure 11:
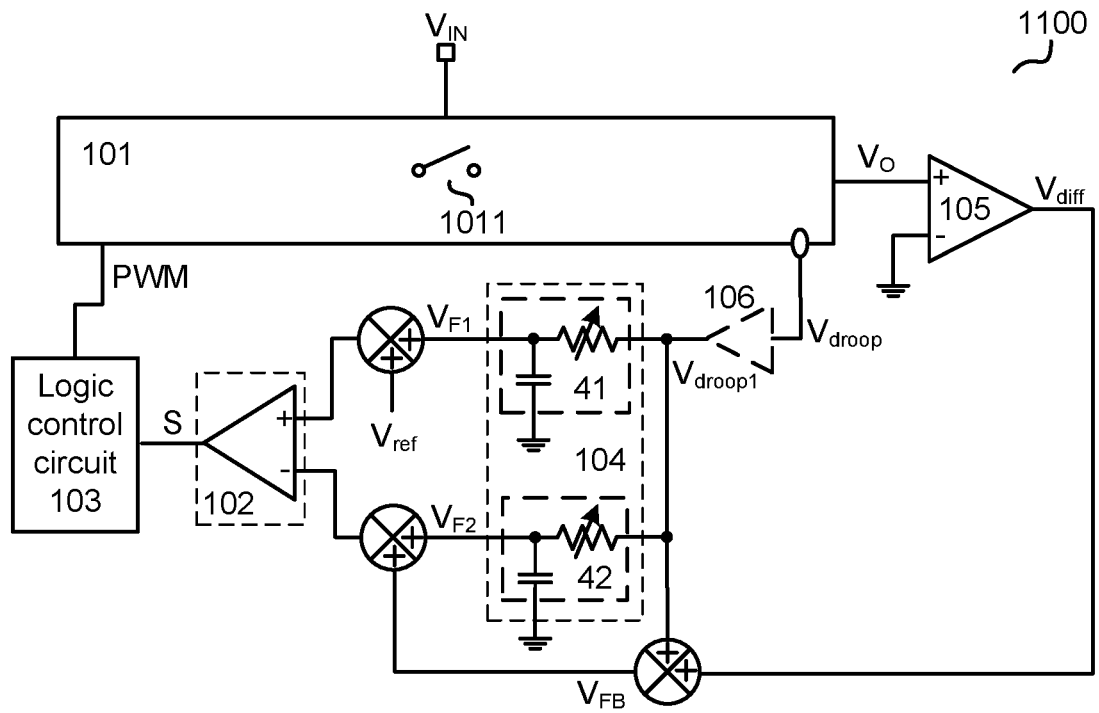
FIG. 11 schematically shows a DC-DC converter 1100 in accordance with an embodiment of the present invention.

FIG. 11 schematically shows a DC-DC converter 1100 in accordance with an embodiment of the present invention. In the example of the embodiment, the comparison circuit 102 compares the sum of the first filtering signal $V_{F1}$ and the reference voltage $V_{ref}$ with the sum of the second filtering signal $V_{F2}$, the differential voltage $V_{diff}$ and the droop voltage $V_{droop}$, so as to generate the set signal S. Namely, the complete information of the droop voltage $V_{droop}$ is introduced to the feedback control loop.

The structure and the operation of the DC-DC converter 1100 shown in FIG. 11 are similar with the aforementioned DC-DC converter 500. So the detailed description is omitted here for brevity.

Figure 12:
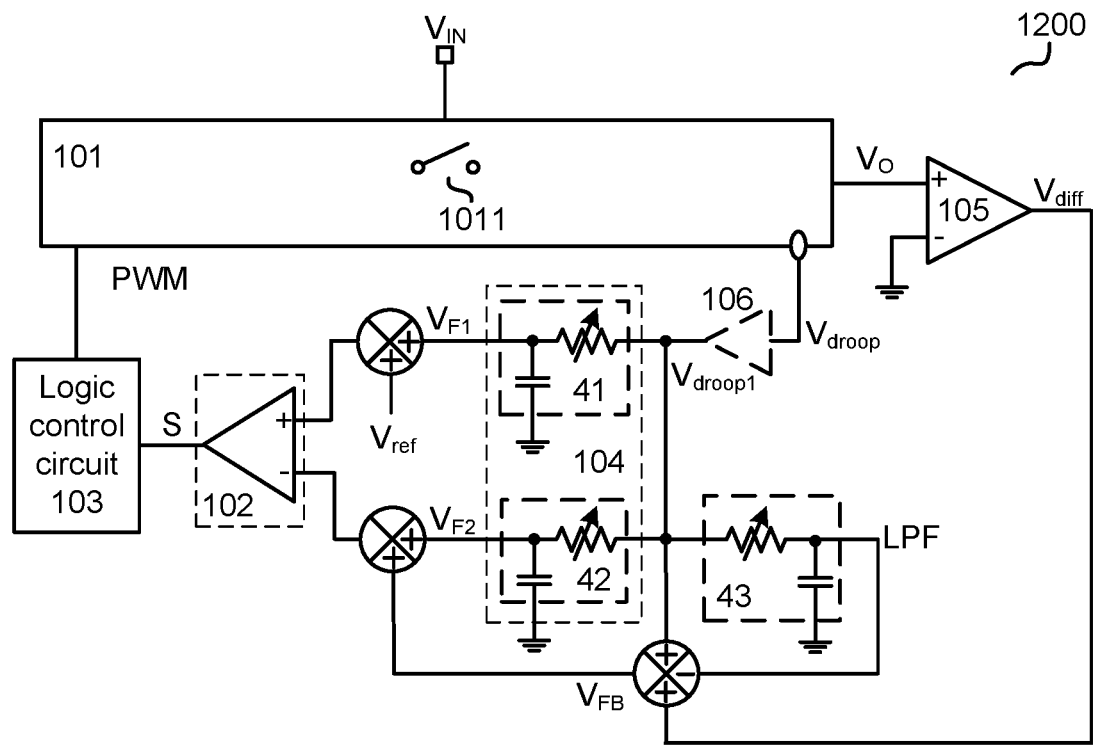
FIG. 12 schematically shows a DC-DC converter 1200 in accordance with an embodiment of the present invention.

FIG. 12 schematically shows a DC-DC converter 1200 in accordance with an embodiment of the present invention. The DC-DC converter 1200 is similar with the DC-DC converter 1100 shown in FIG. 11 with something different. In the example of FIG. 12, the DC-DC converter 1200 comprises a low-pass filter 43, wherein the high-frequency components of the droop voltage $V_{droop}$ is filtered out by the low-pass filter 43, and a low-pass filtering signal LPF is obtained. The low-pass filtering LPF is subtracted from the sum of the differential voltage $V_{diff}$ and the droop voltage $V_{droop}$, then the second filtering signal $V_{F2}$ is added up, and the final result is provided to the comparison circuit 102 to be compared with the sum of the first filtering signal $V_{F1}$ and the reference voltage $V_{ref}$.

Since the low-pass filtering signal LPF is provided to the comparison circuit 102 in a way of being subtracted, the low-frequency components of the droop voltage $V_{droop}$ is counteracted by the low-pass filtering signal LPF and the high-frequency components of the droop voltage $V_{droop}$ is kept. Namely, the transient information of the output current $I_o$ is introduced to the feedback control loop.

The structure and the operation of the DC-DC converter 1200 shown in FIG. 12 are similar with the aforementioned DC-DC converters. The detailed description here is omitted for brevity.

Figure 13:
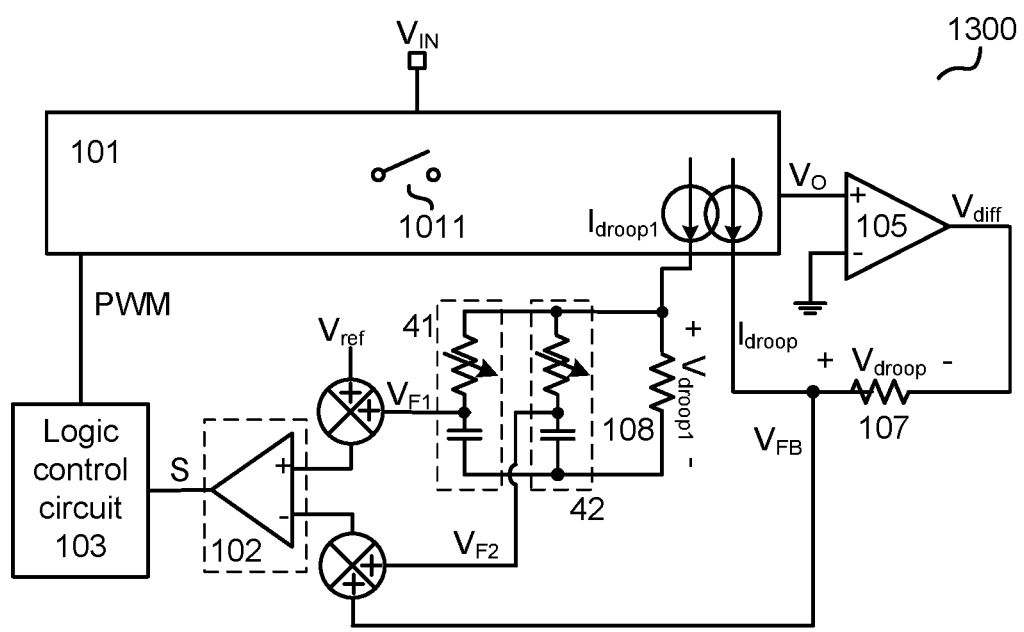
FIG. 13 schematically shows a DC-DC converter 1300 in accordance with an embodiment of the present invention.

FIG. 13 schematically shows a DC-DC converter 1300 in accordance with an embodiment of the present invention. In the example of FIG. 13, the DC-DC converter 1300 comprises: the switching circuits 101, wherein the power switch is turned on and off periodically to convert the input voltage $V_{IN}$ to the output voltage $V_o$ to supply power for a load (e.g. a CPU); a first resistor 107, wherein a droop current $I_{droop}$ indicative of the output current $I_o$ flows through the first resistor 107, so as to generate the droop voltage $V_{droop}$ across the first resistor 107; a second resistor 108, wherein a mirror current $I_{droop1}$ that mirrors the droop current $I_{droop}$ flows through the second resistor 108, so as to generate the droop regulating signal $V_{droop1}$; the first filter 41, low-pass filtering the droop regulating signal $V_{droop1}$ to generate the first filtering signal $V_{F1}$, the second filter 42, low-pass filtering the droop regulating signal $V_{droop1}$ to generate the second filtering signal $V_{F2}$; the comparison circuit 102, comparing the sum of the first filtering signal $V_{F1}$ and the reference voltage $V_{ref}$ with the sum of the second filtering signal $V_{F2}$, the differential voltage $V_{diff}$ and the droop voltage $V_{droop}$, to generate the set signal S; the logic control circuit 103, generating a control signal PWM based on the set signal S to control the switching circuit 101. Wherein, the proportion of the mirror current $I_{droop1}$ to the droop current $I_{droop}$ is adjustable, the resistance of the second resistor 108 is adjustable, so that the voltage levels of the first filtering signal $V_{F1}$ and the second filtering signal $V_{F2}$ is the same with the differential voltage $V_{diff}$.

The structure and the operation of the DC-DC converter 1200 shown in FIG. 12 are similar with the aforementioned DC-DC converters. The detailed description here is omitted for brevity.

Figure 14:
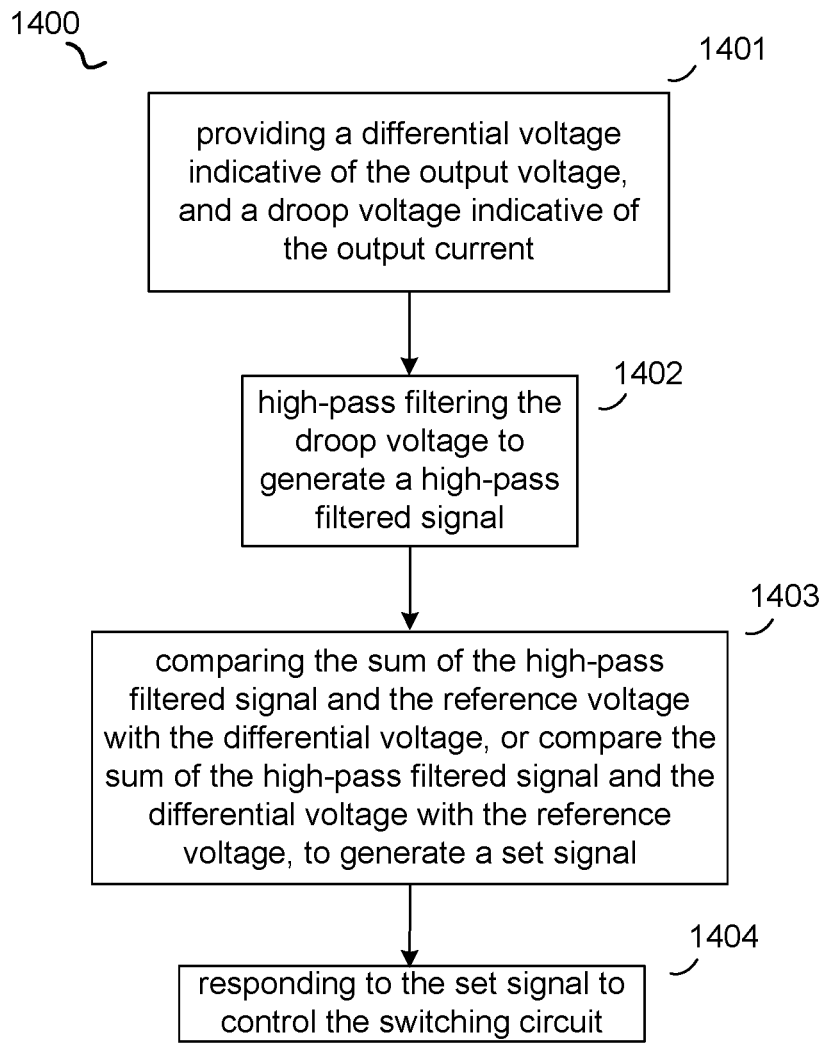
FIG. 14 illustrates a flow gram of a method 1400 for a DC-DC converter in accordance with an embodiment of the present invention.

FIG. 14 illustrates a flow gram of a method 1400 for a DC-DC converter in accordance with an embodiment of the present invention. The DC-DC converter comprises a switching circuit, receives an input voltage and provides an output voltage to supply power for a load (e.g. CPU). The method 1400 comprises:

Step 1401, providing a differential voltage indicative of the output voltage, and a droop voltage indicative of an output current;

Step 1402, high-pass filtering the droop voltage to generate a high-pass filtered signal;

Step 1403, comparing the sum of the high-pass filtered signal and the reference voltage with the differential voltage, or comparing the sum of the high-pass filtered signal and the differential voltage with the reference voltage, to generate a set signal;

Step 1404, responding to the set signal to control the switching circuit.

In an embodiment, the method 1400 further comprises: adding the droop voltage with the differential voltage to obtain a voltage feedback signal; comparing the sum of the high-pass filtered signal and the reference voltage with the voltage feedback signal, or comparing the sum of the high-pass filtered signal and the voltage feedback signal with the reference voltage, to generate the set signal.

In an embodiment, the method 1400 further comprises: generating a mirror current that mirrors a current flowing through the switching circuit, wherein the mirror current flows through a resistor to obtain the droop voltage across the resistor.

In an embodiment, "high-pass filtering the droop voltage" comprises: all-pass filtering the droop voltage to obtain a first filtering signal; low-pass filtering the droop voltage to obtain a second filtering signal; subtracting the second filtering signal from the first filtering signal to obtain the high-pass filtered signal.

While specific embodiments of the present invention have been provided, it is to be understood that these embodiments are for illustration purposes and not limiting. Since the invention can be practiced in various forms without distracting the spirit or the substance of the invention, it should be understood that the above embodiments are not confined to any aforementioned specific detail, but should be explanatory broadly within the spirit and scope limited by the appended claims. Thus, all the variations and modification falling into the scope of the claims and their equivalents should be covered by the appended claims.

What is claimed is:

1. A DC-DC converter, comprising:
a switching circuit having a power switch, wherein the power switch is turned on and off periodically to convert an input voltage to an output voltage to supply power to a load;
a comparison circuit, generating a set signal based on a sum of a first filtering signal and a reference voltage, and a sum of a second filtering signal and a differential voltage, wherein the first filtering signal and the second filtering signal are respectively obtained by low-pass filtering a droop voltage, the differential voltage is indicative of the output voltage, and the droop voltage is indicative of an output current; and
a logic control circuit, generating a control signal based on the set signal to control the switching circuit.

2. The DC-DC converter of claim 1, further comprising:
a first filter, having an operating bandwidth, configured for receiving the droop voltage and generating the first filtering signal; and
a second filter, having an operating bandwidth, configured for receiving the droop voltage and generating the second filtering signal; wherein
respective operating bandwidths of the first filter and the second filter are adjustable.

3. The DC-DC converter of claim 2, wherein the operating bandwidth of the first filter is configured such that the first filtering signal is obtained by low-pass filtering the droop voltage and the operating bandwidth of the second filter is configured such that the second filtering signal is obtained by all-pass filtering the droop voltage.

4. The DC-DC converter of claim 2, wherein the operating bandwidth of the first filter is configured such that the first filtering signal is obtained by all-pass filtering the droop voltage and the operating bandwidth of the second filter is configured such that the second filtering signal is obtained by low-pass filtering the droop voltage.

5. The DC-DC converter of claim 2, wherein at least one of the first filter and the second filter comprises an RC filter having an adjustable resistor and a capacitor.

6. The DC-DC converter of claim 1, further comprising:
a resistor, wherein a current flowing through the resistor is in proportion to a current flowing through the power switch of the switching circuit, and a voltage across the resistor is the droop voltage.

7. The DC-DC converter of claim 1, further comprising:
a buffer, providing a regulated droop signal based on the droop voltage, wherein the regulated droop signal is provided to the first filter and the second filter.

8. A method of controlling a DC-DC converter, wherein the DC-DC converter comprises a switching circuit to convert an input voltage to an output voltage for supplying power to a load, the method comprising:
providing a differential voltage indicative of the output voltage, and a droop voltage indicative of an output current;
filtering the droop voltage respectively through a first filter to generate a first filtering signal, and through a second filter to generate a second filtering signal;
comparing a sum of the first filtering signal and a reference voltage with a sum of the second filtering signal and the differential voltage to generate a set signal; and
responding to the set signal to control the switching circuit.

9. The method of claim 8, wherein the first filter is configured such that the first filtering signal is obtained by low-pass filtering the droop voltage, and the second filter is configured such that the second filtering signal is obtained by all-pass filtering the droop voltage.

10. The method of claim 8, wherein the first filter is configured such that the first filtering signal is obtained by all-pass filtering the droop voltage, and the second filter is configured such that the second filtering signal is obtained by low-pass filtering the droop voltage.

* * * * *